Oct. 29, 1968        J. W. FELLOWS        3,407,890
CONTROL PROVISION FOR BULK MATERIAL WEIGHING SYSTEMS
Filed April 1, 1966        4 Sheets-Sheet 1
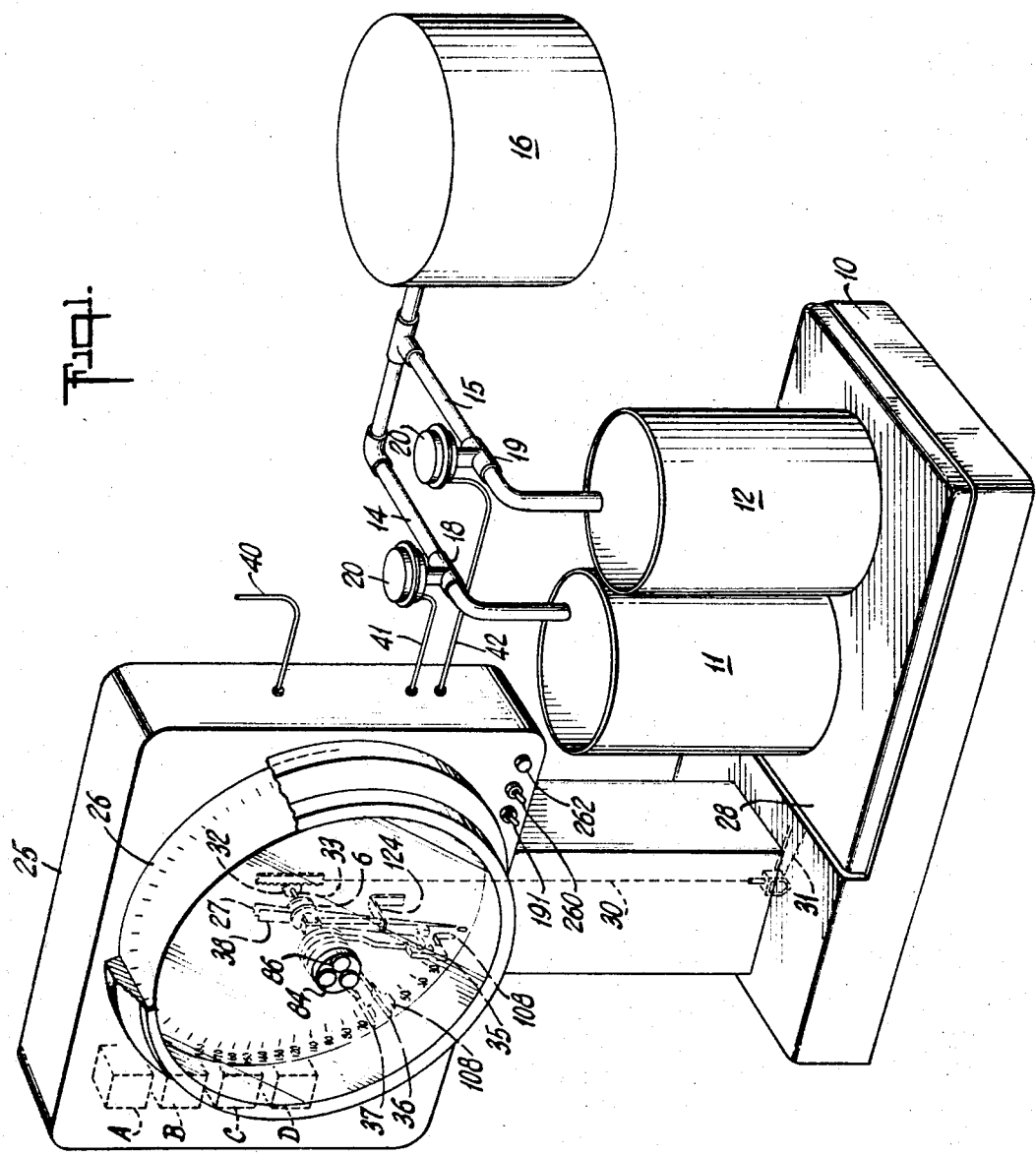
INVENTOR
JAMES W. FELLOWS
BY George A. Woodruff
ATTORNEY

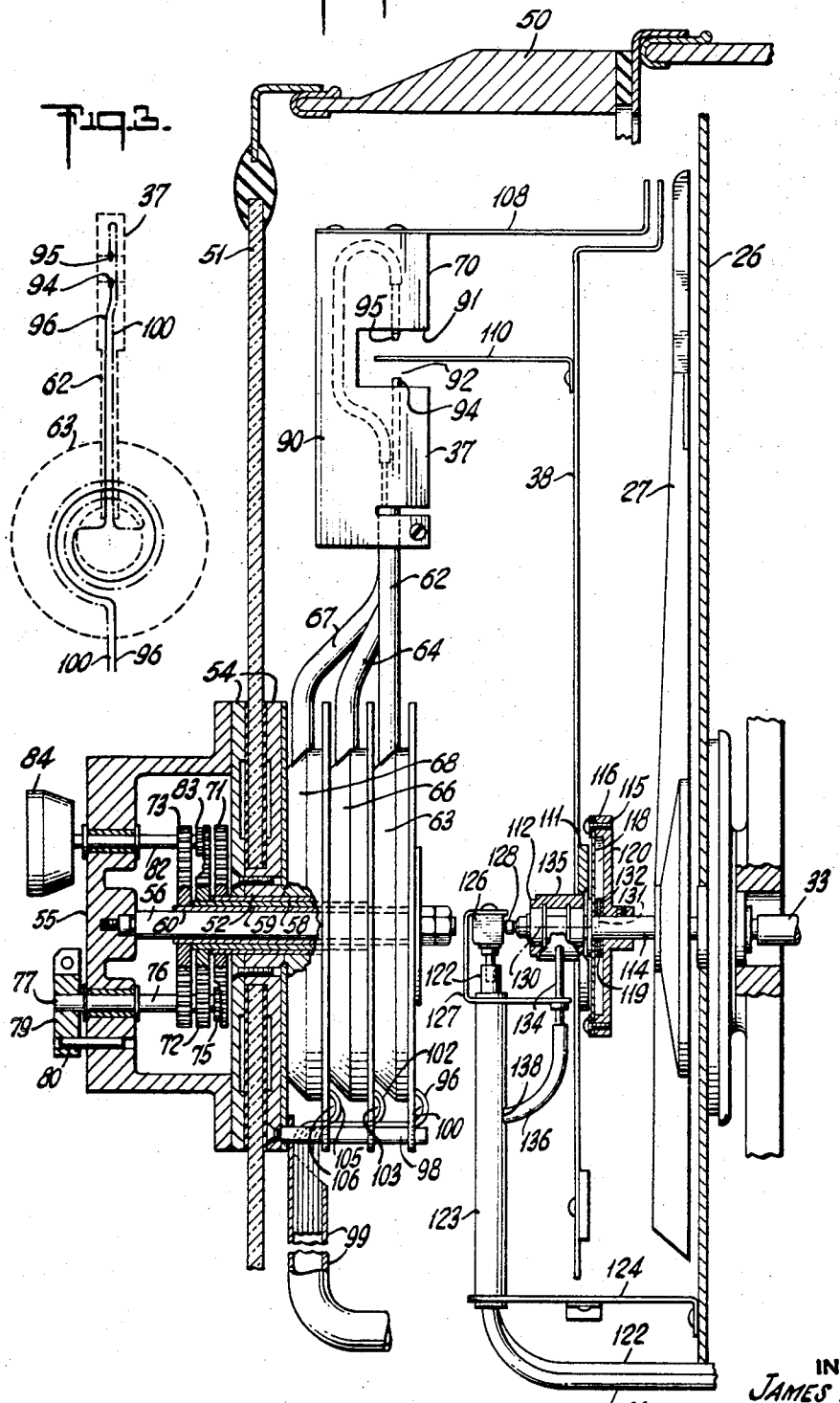

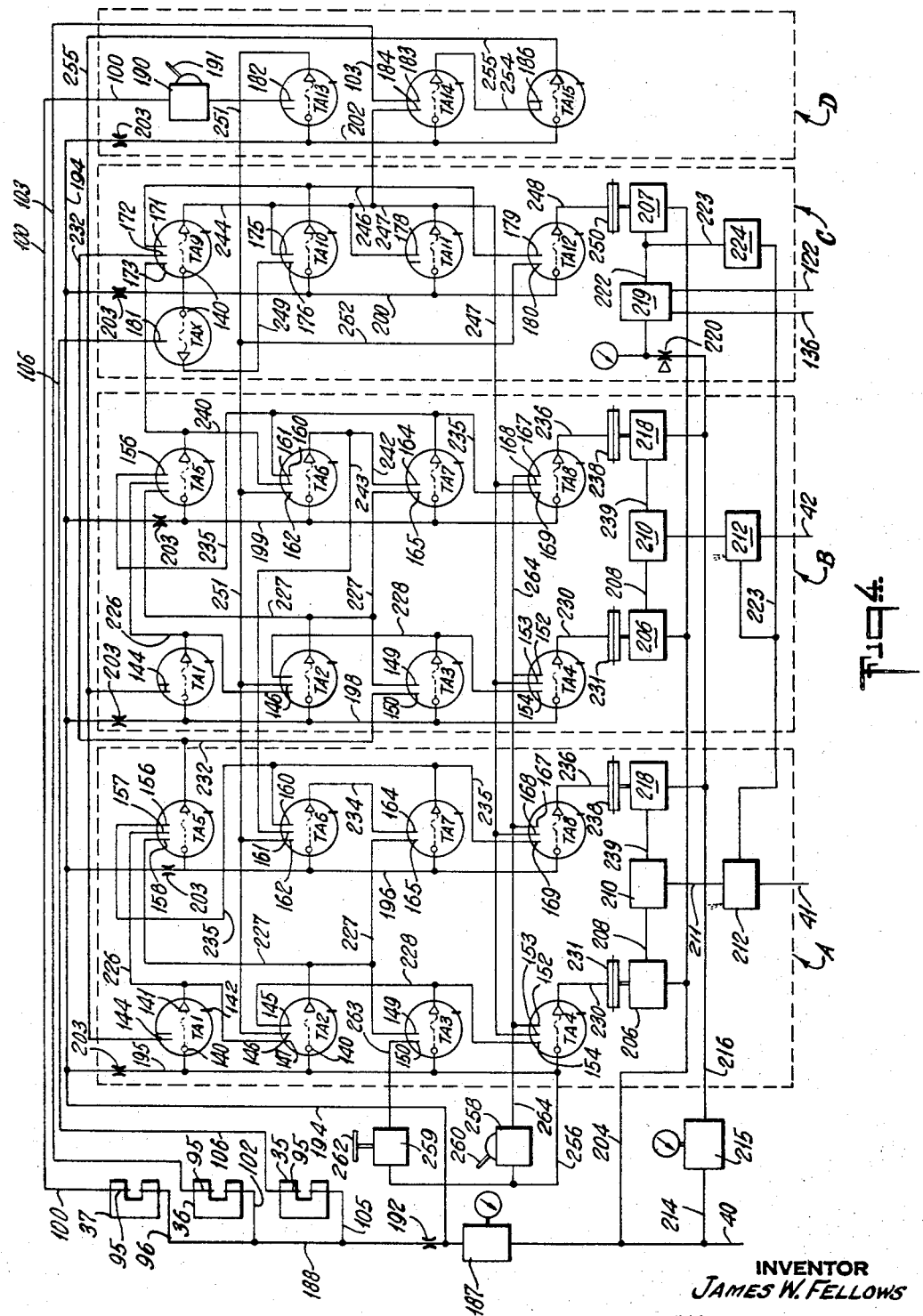

Oct. 29, 1968  J. W. FELLOWS  3,407,890
CONTROL PROVISION FOR BULK MATERIAL WEIGHING SYSTEMS
Filed April 1, 1966  4 Sheets-Sheet 4

Fig. 5.

| Unit | | Initial Condition | | Filling Operation Unit A | | | | Transfer Operation to Unit B | | | |
|---|---|---|---|---|---|---|---|---|---|---|---|
| | | | | Fast | | Dribble | | Initial | | Final | |
| | | Output | No Output | Output | No Output | Output | No Output | Output | No Output | Output | No Output |
| Unit A | TA1 |  | X |  | X | X |  |  | X |  | X |
| | TA2 |  | X | X |  |  | X |  | X |  | X |
| | TA3 | X |  |  | X | X |  | X |  | X |  |
| | TA4 |  | X | X |  |  | X |  | X |  | X |
| | TA5 |  | X |  | X |  | X | X |  |  | X |
| | TA6 |  | X | X |  |  | X |  | X |  | X |
| | TA7 | X |  |  | X |  | X |  | X | X |  |
| | TA8 |  | X | X |  |  | X |  | X |  | X |
| Unit B | TA1 |  | X |  |  |  |  |  | X |  | X |
| | TA2 |  | X |  |  |  |  | X |  | X |  |
| | TA3 | X |  |  |  |  |  |  | X |  | X |
| | TA4 |  | X |  |  |  |  |  | X | X |  |
| | TA5 |  | X |  |  |  |  |  | X |  | X |
| | TA6 |  | X |  |  |  |  | X |  | X |  |
| | TA7 | X |  |  |  |  |  |  | X |  | X |
| | TA8 |  | X |  |  |  |  |  | X | X |  |
| Unit C | TAX | X |  |  | X |  | X |  | X |  | X |
| | TA9 | X |  | X |  | X |  |  | X | X |  |
| | TA10 |  | X |  | X |  | X | X |  |  | X |
| | TA11 |  | X |  | X |  | X | X |  |  | X |
| | TA12 |  | X | X |  |  | X |  | X | X |  |
| Unit D | TA13 | X |  |  | X |  | X |  | X |  | X |
| | TA14 |  | X |  | X | X |  | X |  |  | X |
| | TA15 | X |  | X |  |  | X | X |  | X |  |

INVENTOR
JAMES W. FELLOWS
BY George A. Woodruff
ATTORNEY

United States Patent Office 3,407,890
Patented Oct. 29, 1968

3,407,890
CONTROL PROVISION FOR BULK MATERIAL WEIGHING SYSTEMS
James W. Fellows, St. Johnsbury, Vt., assignor to Fairbanks Morse Inc., New York, N.Y., a corporation of Delaware
Filed Apr. 1, 1966, Ser. No. 539,336
16 Claims. (Cl. 177—60)

This invention relates to weighing systems, and more particularly to improved control provisions especially suitable for, but not limited to, weighing systems provided for bulk weighing of selected material.

The present invention is directed to the utilization of weight sensing interruptable air jet devices and fluid flow relays devoid of moving parts, arranged in cooperative relationship forming an improved control system applicable to bulk weighing operations, and which avoids inherent disadvantages found in heretofore known systems employing mechanical, electrical, or conventional pneumatic valve controls. Accordingly:

An object of the invention is to provide an improved air operated control arrangement for weighing apparatus, characterized by relatively simple and small size parts readily capable of compact assembly, high speed and fidelity of operating response, and a low rate of air consumption, and which is entirely explosion-proof.

Another object is to provide in weighing apparatus having a weight indicating dial and main pointer, an improved control arrangement providing a clutch controlled auxiliary dial pointer, auxiliary pointer position sensing elements or air switch devices positionable relative to the dial and each having spaced apart air transmitter and receiver nozzles, wherein low pressure air delivered to the transmitter nozzle normally establishes an air stream into the receiver nozzle, an interceptor element on the auxiliary dial pointer for intercepting the air stream when the pointer approaches the sensing element, and a switching circuit under control of the sensing elements for controlling operation of a desired device or mechanism to be controlled as, for example, one or more material feed control gates.

Another object is to provide an improved control arrangement of the character stated in the foregoing object, wherein the switching circuit embodies low pressure fluid (air) relays devoid of mechanical moving parts, referred to in the art as turbulence amplifiers. In a simple form thereof which is preferred and herein utilized, the relay comprises a chamber having aligned, spaced apart supply input and collector tubes, one or more controlling air signal input tubes generally normal to the axis of the input and collector tubes and terminating in open ends relatively near such axis, and a chamber vent opening near the collector tube. Such relays function with quite low pressure air delivery to the supply and control inputs. For example, with determined spacing of the supply input and collector tubes, air delivered to the supply input tube at say a pressure of the order of 10 to 12 inches of water gauge, will establish (absent air supply to any air signal input tube) a laminar stream or flow of air in the chamber to and into the collector tube. Air output from the collector tube then will be at a relatively low pressure as of the order of 3 to 4 inches of water gauge, usable as an output operating signal. Now upon delivery of control air under low pressure, as of the order of 3 to 4 inches of water gauge, to an air signal input tube, such air in discharge from the latter and impinging on the air stream to the collector tube, will reduce the stream to a turbulent condition in deflection from the collector tube to discharge through the chamber vent. The output operating air signal from the collector tube thus will be cut-off, but will restore immediately upon cessation of control air delivery to the chamber via the air signal input tube (or tubes, if more than one). It will be appreciated that such relay is essentially a "Norgate" device, having two stable conditions, namely, an operating air signal output or no output, wherein response of the device in change from one condition to the other is very rapid.

The foregoing as well as other objects and advantages of the invention will appear from the following description of a presently preferred embodiment thereof as illustrated in the accompanying drawings, wherein:

FIG. 1 is a view in perspective of weighing apparatus embodying the present improvements;

FIG. 2 is an enlarged, fragmentary sectional view of the scale dial indicator head, showing elements of the present improvement;

FIG. 3 illustrates diagrammatically one of the air switch devices and its air supply and delivery conduit arrangement relative to the switch supporting structure;

FIG. 4 illustrates in schematic form the air switch and air relay control system according to the present embodiment of the invention, and FIG. 5 presents a tabulation of output and no output conditions of the air relay elements in the relay control system, occuring initially and in the operational stages of the system.

With reference to the drawings, the present exemplary embodiment of the invention is shown in application to bulk material weighing apparatus of relatively simple form. As appears in FIG. 1, a suitable platform type weighing scale 10 is provided for load support of cans, barrels or other bulk containers as the containers 11 and 12. Suitably positioned for material feed to the containers are delivery conduits 14 and 15 leading from the supply bin 16 containing a given material (liquid, flowable solid, etc.). Material flow from bin 16 may be by gravity feed or by positive delivery as by suitable pump means (not shown). The delivery conduits include, respectively, control gates 18 and 19 which may be gate valves or other conventional type valves each normally closed and actuatable to an open condition by an air pressure responsive device or motor 20.

Scale 10 includes a dial indicator head 25 having weight index dial 26 and main pointer or indicator hand 27, the latter being operated from the scale lever system (not shown) supporting scale platform 28, in known manner here indicated diagrammatically in broken lines as comprising a rack rod 30 extending from the lever system output lever 31 to a pinion 32 on the indicator shaft 33. The present improved control arrangement for the feed valves 18 and 19 is contained in the dial head 25. As indicated in FIG. 1 such includes pneumatic relay units A and B, and control units C and D, all suitably compactly located in the rear portion of the dial head (the locations thereof shown in FIG. 1 being exemplary only), and pneumatic sensing switch devices 35, 36 and 37 positionable relative to the index dial 26 in a manner presently to be described. These air switches are operatively associated with the relay units and with an auxiliary dial pointer or hand 38 as will hereinafter appear. Air under suitable pressure which may be in the range of 80–100 p.s.i., is delivered from a source (not shown) to the relay units by supply conduit 40 entering the dial head, while valve operating air pressure under control of the relays is delivered to the motors 20 of feed valves 18 and 19 by the respective conduits 41 and 42.

Referring now to FIGS. 1, 2 and 3, the dial head structure 25 includes a frame extension 50 outwardly from the indicia face of the index dial 26, terminating in a front plate 51 of glass or other transparent material having a central aperture to receive the hub 52 of a support structure 54 suitably clamped to the plate. Support 54 includes an outer case member 55 carrying a spindle 56 extending through the hub 52 in axial alignment with indicator shaft 33. On spindle 56 are nested sleeve shafts 58, 59 and 60 rotatable relative to each other and to the spindle, and wherein the outer sleeve shaft 58 is journalled in hub 52 as a further support for the spindle and sleeve shaft assembly. A hollow arm 62 is carried by hollow shroud member 63 having a hub (not shown) fixed on sleeve shaft 60, the arm supporting at its outer end the air switch device 37. Similarly, hollow arm 64 is carried by shroud 66 fixed on sleeve shaft 59, and hollow arm 67 is carried by shroud 68 fixed on sleeve shaft 58, these arms supporting respectively the air switch devices 36 and 35 (FIG. 1.). Arm 62 is radial while arms 64 and 67 have an angulate trend, such that the corresponding inner faces of the switch devices (only the inner face 70 of switch device 37 being shown in FIG. 3) lie in a common plane parallel to the plane of the index dial 26. Further, the switch devices are radially equi-distant from the spindle 56, for a purpose to appear.

Located in casing 55 are gears 71, 72 and 73 fixed respectively to the sleeve shafts 58, 59 and 60. Enmeshing gear 71 is a pinion 75 on a shaft element 76 carried by the casing 55, the shaft element terminating outwardly of the casing and having a slot 77 in its exposed end for receiving a screw driver or other similar tool by which to turn the shaft element for rotating through the gearing, the arm 67 and its switch device 35 to a selected position (as will be noted hereinafter). Locking of the shaft element in desired rotated position may be attained in any suitable manner, as by the releasable split-clamp 79 connected by pin 80 to the casing 55. A second shaft element 82 having pinion 83 meshing with gear 72, is operable by hand knob 84 for angularly moving the arm 64 and its switch device 36 to locate the latter in desired position relative to the index dial as will hereinafter appear. A third shaft element and pinion assembly (not shown) is operatively associated with gear 73 for locating switch device 37, and this assembly is like that respecting the shaft element 76, including a locking clamp 86 indicated in FIG. 1. It is to be noted here that for convenience in respect to the showing of FIG. 2, the switch arm 67 is there illustrated in position near the other arms and 64 and 62, but normally such arm and its switch device 35 will be located in set position relative to the zero indicia point of the index dial 26, as illustrated in FIG. 1 and to be further described presently.

The switch devices 35, 36 and 37 are identical, each comprising (as appears from the device 37 shown in FIG. 2) a block 90 having a recess 91 forming an air gap region 92 open to the block face 70, an air supply or transmitter nozzle 94 opening to the air gap 92, and an air receiver nozzle 95 open to the gap 92 and in alignment with nozzle 94. In respect to switch device 37, air supply to nozzle 94 is over a flexible conduit or tubing element 96 from a source to be indicated. Conduit 96 is extended from the nozzle through hollow arm 62 to a partly coiled condition in shroud 63 as exhibited in the diagrammatic view of FIG. 3, and thence along a support 98 and through a cable housing 99 leading to the pneumatic relay system hereinafter to be described. A like flexible conduit 100 extends from connection internally of the switch block with the receiver nozzle 95, through arm 62 to coiled relation in shroud 63 and thence to cable 99. In like manner, the respective air supply and output conduits 102 and 103 of switch device 36 extends from shroud 66 to cable 99, while the respective supply and output conduits 105 and 106 of switch device 35 extend from shroud 68 to cable 99. The conduit coils in the shrouds afford conduit-slack for permitting angular displacements of the switch devices, as this will be understood. Also, each switch device is provided with an index pointer 108 (FIG. 3) extending toward the index dial 26, to facilitate switch device alignment with a desired indicia of the dial.

It is noted at this point in the description, that air under pressure delivery to the transmitter nozzle 94 of each switch will be discharged therefrom in the form of an air stream across the open gap 92 in block recess 91, and unless such stream is intercepted, it will enter the receiver nozzle 95 of the switch to establish an air signal flow through the output conduit of the switch for performing a control function in the associated relay assembly. In accordance with the present invention objectives, the switches are provided to function on low pressure air supply, as for example air supply to the transmitter nozzle at a low pressure of the order of 12 to 14 inches of water gauge. With a determined spacing of the transmitter and receiver nozzle (a typical spacing of about ½ inch in the presently illustrated embodiment), the jet air stream from the transmitter nozzle will enter the receiver nozzle and establish flow into the output conduit at a considerably lower pressure, as in the range of 3 to 4 inches of water gauge. Such low pressure air signal output from the switches is entirely sufficient for control of turbulence amplifier air relays as herein employed in the relay units A to D, to be described in connection with the system shown in FIG. 4. Also, utilizing switch supply and output air flows at the very low pressures indicated, not only enables the employment of very small bore (as of the order of one-thirty second inch) air conduits and nozzles which permit space and weight saving, but contributes materially to a desirable low rate of air consumption in the system. It is pointed out here that the nature and construction of the air switches 35, 36 and 37 appear in greater detail in application Serial No. 509,929, filed Nov. 11, 1965, by the present applicant now Patent No. 3,343,616 granted Sept. 26, 1967, to which reference may be had.

As shown in FIG. 3 the switch 37 in mounted condition has the open side of its nozzle recess 91 facing the index dial 26, and is spaced outwardly from the plane of angular displacement of the auxiliary indicator hand 38. Carried by the hand 38 in outward projection therefrom is an interceptor element 110 formed from suitable flat strip material of desired width. The interceptor element is located on the hand such that as the hand approaches or attains the position of the switch 37, it will be entered substantially centrally between the switch nozzle ends and thereby intercept the nozzle air stream. Such interception will of course result in cutting-off air stream reception by the receiver nozzle 95, so that there is then no air signal flow in the output conduit connection of the switch. The interceptor 110 performs the same function in respect to the other switches 35 and 36 as the hand 38 attains the position of each.

In the present embodiment of the invention, the auxiliary pointer or hand 38 is operatively associated with the indicator shaft 33 through an air operated clutch means the character and details of which are included in the subject matter of Letters Patent No. 3,238,916, granted Mar. 8, 1966, and assigned to the assignee of this application. While reference may be had to that patent for a detailed disclosure, for the purpose of the present application the clutch arrangement as illustrated in FIG. 2 is here briefly described as follows.

The auxiliary pointer or hand 38 is fixed to a disc 111 forming part of an air clutch assembly, the disc being integral with a hub 112 freely journalled on a shaft extension 114 of the indicator shaft 33. Suitably mounted on the shaft extension for rotation therewith, is a circular plate having a continuous annular flange 116 at its periphery. A circular clutch disc element 118 in the form of a diaphragm of suitable flexible material, has its peripheral margin in sealed support on the plate flange 116 and its body portion opposed to the disc 111. Sealing of the diaphragm at its zone about the shaft extension is attained by suitable diaphragm spacer and seal means 119. The space between the diaphragm 118 and the plate 115 constitutes an air chamber 120, so that upon admission of air under pressure to the chamber the diaphragm will be distended to clutching contact with disc 111 for causing rotation of the auxiliary hand 38 together with main pointer 27, consequent to rotation of the indicator shaft 33.

Clutch actuating pressure air is supplied from a source and controlled as will be hereinafter noted, through a flexible conduit 122 extending upwardly in a support tube 123 carried on a bracket 124 preferably fixed to the index dial 26 as shown. The conduit is connected to a nozzle device 126 carried by bracket 127 on tube 123 and providing a discharge nozzle 128 axially of the shaft extension 114 and slightly spaced from the free end of the latter. In shaft extension 114 is an axial bore indicated by broken line 130 open to the free end of the shaft extension for receiving air from nozzle 128, such bore terminating in at least one lateral shaft passage shown by broken line 131 opening to a passage 132 in spacer-seal means 119, the latter passage opening to clutch chamber 120. Since the bore 130 is open to atmosphere at the gap relative to nozzle 128, in the absence of nozzle air delivery the chamber 120 will be vented through bore 130, and hence the clutch diaphragm then will occupy a retracted or collapsed position out of engagement with disc 111. In that condition of the clutch the auxiliary hand 38 will be free of driven connection with the indicator shaft.

In the de-clutched condition, the auxiliary hand 38 is disposed at, or returned to, dial zero position by air motor means. Such motor means includes an air discharge nozzle 134 carried on bracket 127 and directed for air discharge tangentially of the clutch disc hub 112, against blade elements 135 on the hub periphery which may be provided by knurling the hub periphery. Nozzle 134 is on that side of hub 112 which upon air discharge against its blades 135, will produce counter-clockwise rotation of the auxiliary hand 38 (as viewed in FIG. 1) to the dial zero position. The bracket 124 here serves by proper location thereof on index dial 26, as a stop for determining dial zero position of the auxiliary hand when in abutment therewith. Thus, so long as air discharge from nozzle 134 is present, the motor will retain the auxiliary hand at dial zero. Pressure air supply to nozzle 134 is from a source and controlled as will be presently described, through a flexible conduit 136 leading upwardly in support tube 123 and laterally therefrom through tube opening 138, to connection with nozzle 134 as shown.

With further reference to FIGS. 1 and 2, the present control provisions afford automatic sequential filling of containers, as the containers 11 and 12 on scale platform 28, in a manner including main and dribble material feed into each container for more accurate filling to a desired net weight content. This will appear more fully from subsequent description of the sensing switch and relay control system shown in FIG. 4. However, it is noted here that in the initial pre-filling condition, the sensing switch device 35 is set in registry with the dial zero indicia of index dial 26, as illustrated in FIG. 1. This may be accomplished by loosening the clamp 79, inserting a screw drive or like tool in the slot 77 of shaft 76, and turning the shaft in the direction to bring the arm 67 and switch 35 to a position in which the switch pointer 108 registers with dial zero, whereupon the clamp is re-tightened to hold the switch as so positioned. Next and in a like manner as described for switch 35, the switch 37 is turned up-scale until its pointer 108 registers with the weight indicia of index dial 26 equal to the predetermined maximum material weight capacity of the given container to be filled, and is then clamped at that position. Switch device 37 is a safety provision operating as will hereinafter appear, to preclude in the event of abnormal operating condition in the control system, material spill-over or filling beyond the container weight capacity. With switch device 37 so located, the hand knob 84 is turned in the proper direction to bring arm 64 and its switch device 36 to a position wherein the pointer 108 of the switch registers with the index dial indicia equal to the desired net weight of material to be introduced to each container.

Upon placement of empty containers 11 and 12 on scale platform 28, the main dial indicator pointer or hand 27 will be rotated from dial zero to a weight indicia on index dial 26 indicating the tare weight of the two containers. Thus the indicator hand 27 will show tare weight, gross weight of container 11 when filled to the desired net weight, and finally gross weight of both containers when container 12 is filled. However and if desired, although not here illustrated, the scale may include a tare balancing provision which may be of usual or other conventional character, operative to bring the indicator hand 27 to dial zero with the empty containers on the platform. Regarding main and dribble feed through the gate valves 18 and 19, it is noted that each valve opening motor 20 is of known character, adapted to respond to air pressure at 80–100 p.s.i. for effecting full opening of its gate valve, and to a determined lesser air pressure for effecting only partial opening of its gate valve, as to an extent determining a desired rate of dribble feed.

Turning now to FIG. 4, this illustrates schematically the sensing switch and air relay control system according to the present embodiment of the invention. The system includes air relay units A, B, C and D each having a predetermined number of pneumatic relay elements, referred to as "turbulence amplifiers" (T.A.), these being of known character and construction as hereinbefore described in a stated object of the invention. Each element has an air input nozzle 140, an opposite collector or air output nozzle 141, a vent 142, and one or more control air signal input tubes generally normal to the axis of the input and output nozzles. Relay unit A which is in control of the motor 20 of material feed gate valve 18, contains eight relay elements identified as TA1 through TA8. Element TA1 is provided with control tube 144; TA2 with control tubes 145, 146 and 147; TA3 with tubes 149 and 150; TA4 with tubes 152, 153 and 154; TA5 with tubes 156, 157 and 158; TA6 with tubes 160, 161 and 162; TA7 with tubes 164 and 165, and TA8 with tubes 167, 168 and 169. Relay unit B in control of the motor 20 on material feed gate 19, is like unit A, having eight elements TA1 through TA8 each having the same number of control tubes as in the corresponding element of unit A and here given the same reference numerals. Relay unit C contains five elements TA9 to TA12 and TAX, and in this unit TA9 has control tubes 171, 172 and 173; TA10 has tubes 175 and 176; TA11 has tube 178, TA12 has tubes 179 and 180 and TAX has tube 181. Relay unit D provides three elements TA13, TA14 and TA15, and in these TA13 has tube 182; TA14 has tubes 183 and 184, and TA15 has tube 186.

In the system as shown, air from a suitable source at a pressure of the order of 80–100 p.s.i. is supplied over conduit 40 to a pressure reducer 187 of known type. The reduced pressure output from the reducer is delivered to manifold 188, and connected to the manifold are the supply lines 105, 102 and 96 to the transmitter nozzles of the air switch devices 35, 36 and 37, respectively. The signal air output line 106 connected to the receiver nozzle 95 of switch 35, extends to control tube 181 of TAX in relay C, while the signal air output line 103 from switch 36 extends to control tube 183 of TA14 in relay D. Signal air output line 100 of switch 37 extends to control tube 182 of TA13 in relay D, this line containing a system on-off switch valve 190. Although valve 190 is shown in the schematic of FIG. 4 as being in the relay unit D, it is disposed to have its actuator handle 191 accessible at the face of the indicator head 25, as this appears in FIG. 1. Further, connection of reducer 187 to manifold 188 is through a flow restrictive device 192 which may be a porous metal plug of known type, this device being selected as to its restrictive effect such as to determine the pressure of signal air at the indicated control tubes of TA10, TA14 and TA13, at a pressure value in the order of 3–4 inches of water gauge.

Extending from pressure-reducer 187 is a second reduced pressure supply conduit 194, from which extends a supply line 195 connected to the input nozzles 140 of TA1 to TA4 in relay unit A; a supply line 196 connected to the input nozzles 140 of TA5 to TA8 in relay A; a supply line 198 connected to the input nozzles of TA1 to TA4 in relay B; a supply line 199 connected to the input nozzles of TA5 to TA8 in relay B; a supply line 200 connected to the input nozzles of TAX and TA9 to TA12 in relay C, and a supply line 202 connected to the input nozzles of TA13 to TA15 in relay D. Each of the indicated supply lines includes a restrictive device 203 similar to device 192, which determines air supply to the input nozzles of the TA elements at a value in the order of 10–12 inches of water gauge.

A conduit 204 connected to supply conduit 40, leads air at full supply pressure to a normally closed high pressure valve 206 in relay unit A, to a like valve 206 in relay unit B, and to a normally closed high pressure valve 207 in relay unit C. Valve 206 in unit A has its output connected by line 208 to one side of a differential pressure or shuttle valve 210, the output from the latter being over line 211 through a delivery delay valve device 212 to line 41 connected to the valve motor 20 of gate valve 18. Similarly, valve 206 in unit B has its output over line 208 to one side of shuttle valve 210, and the output of the latter being by line 211 through delay device 212 to line 42 connected to the motor 20 of gate valve 19.

Branch 214 from supply conduit 40 delivers full pressure air to a pressure-reducer 215, and the reduced pressure output from reducer 215 is over conduit 216 to the input of normally closed low pressure valve 218 in each of the relay units A and B. Conduit 216 extends to the input of a valve 219 (relay unit C) through a variable restriction device 220 settable to determine the air pressure at a low value suitable for operating the auxiliary pointer air clutch and the air motor for returning the auxiliary pointer to dial zero position. Valve 219 normally positioned for air delivery over line 136 to the auxiliary pointer air motor nozzle 134 (FIG. 2), is movable by output air pressure over line 222 from valve 207 to cut-off delivery over line 136 and to effect delivery over line 122 to the clutch nozzle 128 (FIG. 2). Further, a line 223 from output line 222 extends through a time-delay valve device 224, to each delay valve device 212 of relay units A and B.

In relay unit A, output nozzle 141 of TA1 is connected by signal air line 226 to the control tubes 157 of TA5 and 147 of TA2; output nozzle 141 of TA2 connected by 3-way line 227 to the control tubes 158 of TA5, 149 of TA3 and 165 of TA7; and output nozzle 141 of TA3 connected by line 228 to the control tubes 145 of TA2 and 154 of TA4. The output nozzle of TA4 is connected by line 230 to a valve actuator 231 for valve 206, the actuator preferably being of high force capacity diaphragm type effective in response to low signal air pressure from TA4, to open high pressure valve 206. Continuing in unit A, the output nozzle 141 of TA5 is connected by signal air line 232 to control tube 150 of TA3 in relay unit B and to control tube 172 in TA9 of relay unit C; output nozzle of TA6 connected by line 234 to control tube 165 in TA7, and output nozzle of TA7 connected by line 235 to control tube 169 of TA8, to control tube 160 of TA6, and to control tube 156 of TA5. The output nozzle of TA8 is connected by line 236 to valve actuator 238 (similar to actuator 231) for low pressure valve 218, the latter having its output connected by line 239 to one side of shuttle valve 210.

Referring to relay unit B, the connections which are identical to those hereinabove described for relay unit A, are given the same reference characters as appear in the latter unit. Connections differing from unit A are here noted. The output nozzle of TA5 is connected by signal air line 240 to control tube 173 of TA9 in unit C, and to control tube 161 in TA6 of unit B, while the output nozzle of TA6 is connected by line 242 to control tube 164 of TA7 in unit B, and by branch line 243 to control tube 161 of TA6 in unit A.

In relay unit C, the output nozzle of TA9 is connected by signal line 244 to control tube 175 of TA10 and to control tube 178 of TA11, while the output nozzle of TA10 is connected by line 246 to control tube 171 of TA9 and to control tube 179 of TA12. The output nozzle of TA11 is connected by signal line 247 to control tube 184 of TA14 in unit D, to the control tubes 168 and 153 of TA8 and TA4, respectively, in unit B, and to control tubes 168 and 153 of TA8 and TA4, respectively, in unit A. Line 248 connects the output nozzle of TA12 to valve actuator 250 (similar to actuators 231 and 238) of high pressure valve 207. Also, the output nozzle of TAX is connected by line 249 to control tube 176 of TA10.

In relay unit D, the output nozzle of TA13 is connected by signal line 251 to the control tubes 162 and 146 of TA6 and TA2, respectively, in unit B, and to control tubes 162 and 146 of TA6 and TA2, respectively, in unit A, and also by branch line 252 to control tube 180 of TA12 in unit C. The output nozzle of TA14 is connected by line 254 to control tube 186 of TA15, while the output nozzle of TA15 is connected by signal line 255 to control tube 144 of TA1 in relay unit B and to control tube 144 of TA1 in unit A.

Completing the system as shown, low pressure air supply from supply line 195 is conveyed by branch 256 to the inputs of a system "Run-Stop" or over-riding control valve 258 and push-button system start valve 259. These valves are conveniently located in the scale indicator head 25 for manual access to the handle 260 of valve 258 and the push-button 262 of start valve 259 from the front of the head, as shown in FIG. 1. Output from start valve 259 is by line 263 to the control tube 150 of TA3 in relay unit A, while the output line 264 of valve 258 is connected to the control tube 152 of TA4 in each relay unit A and B, and to the control tube 167 of TA8 in each of the units A and B.

*Condition of control system prior to filling operation*

To facilitate understanding of the operational conditions of the air relay or TA elements of units A to D both initially as will be now described, and in the container filling sequence as hereinafter described, reference is directed to FIG. 5 which presents a tabulation of the element conditions as to output or no output.

With given containers 11 and 12 placed on the scale platform 28, the main indicator hand 27 will register the tare weight of the containers on index dial 26. The sensing device 35 is located and locked in registry with the zero indicia of the index dial 26 (FIG. 1). Assuming now, for example, that the maximum capacity of each container is 70 pounds of the given material to be delivered into the containers, and further, that it is desired to fill each container to a net material weight of 60 pounds. Given these factors, the sensing device 37 is moved to registry with the 70 pound indicia on index dial 26 (FIG. 1), while sensing device 36 is disposed in registry with the index dial 60 pound indicia. In the initial state, system valve 190 is in the "off" position (no signal air output therefrom); "Run-Stop" valve 258 is in the "Run" position (which is the valve closed position—no air output on line 264), and start valve 259 is closed.

Now, with air supply at a pressure in the range of 80–100 p.s.i. admitted over line 40, the supply air will pass over line 214 to reducer 215 and therefrom at reduced pressure over line 216 to and through variable restriction device 220 which reduces the pressure to a desired low value, to valve 219 which is then open to pass low pressure air over line 136 (FIGS. 2 and 4) to the nozzle 134 of the air motor 134–135. Air in discharge from nozzle 134 impinges on the projection 135 of the knurled hub 112, and causes rotation of the hub in the direction to bring the auxiliary pointer or hand 38 to the dial zero position of index dial 26. In such position the interceptor 110 of the auxiliary hand is disposed between the discharge and receiver nozzles of sensing device 35, thereby preventing air stream reception by the receiver nozzle 95 of device 35.

Supply air at reduced pressure from pressure-reducer 187 is delivered over conduit 194 and by branches 195, 196, 198, 199, 200 and 202 (each having a pressure reducing restrictor 203 therein), to the input nozzles 140 of the TA elements in the relay units A to D. The low pressure input at the nozzle 140 of each TA element establishes a laminar air flow passing either into the output nozzle 141 or out the exhaust opening 142 of the element, depending upon the absence or presence of signal air at a control tube of the element. Low pressure air from reducer 187 also flows through restrictor plug device 192 (effecting further pressure reduction) to manifold 188. Branches 105, 102 and 96 from manifold 188, lead air to the discharge nozzles of sensing devices 35, 36 and 37, respectively.

Sensing device 37 has air delivery in line 100 but since system valve 190 is then closed, signal air is absent at control tube 182 of TA13 in unit D. TA13 thus has an output to line 251, supplying signal air to the control tubes 146 and 162 of TA2 and TA6 respectively, in each relay unit A and B, so that these TA elements do not have an output. In unit A, absent output from TA2 no signal air appears at tube 149 of TA3, and no signal air at its tube 150 since start valve 259 is now closed. Therefore, air output from TA3 goes by line 228 to control tube 154 of TA4, with consequent cut-off of output therefrom over line 230 to actuator 231, so that high pressure valve 206 is then closed. Also, signal air does not appear at the tubes 164 and 165 of TA7 (outputs from TA6 and TA2 being absent), so that TA7 has an output going to tube 169 of TA8 to cut-off output of the latter to the actuator 238. Thus, low pressure valve 218 remains closed. With valves 206 and 218 closed, there is no air in line 41 to the motor 20 of material feed gate valve 18, so that the latter is closed.

Regarding relay unit B, with air output from TA13 of unit D there is no output from either TA2 or TA6. Consequently, signal air is absent from tube 149 of TA3 and from tubes 164 and 165 of TA7. The element TA7 thus has an output over line 235 to tube 169 of TA8 which interrupts output from the latter to actuator 238, so that low pressure valve 218 remains closed. Also, output of TA7 presents air at tube 156 of TA5 in unit B, thus cutting-off output therefrom. In addition to absence of signal air at tube 149 of TA3 in unit B, signal air is not present at its tube 150, because there is no output from TA5 of unit A, that condition obtaining in view of the output from TA7 of unit A passing over line 236 to the control tube 156 of TA5. Therefore, the output of TA3 in unit B goes to tube 154 of TA4 (unit B), cutting-off output from the latter to actuator 231, so that high pressure valve 206 (unit B) remains closed. Thus with both valves 206 and 218 of unit B closed, no air is in line 42 to the motor 20 of gate valve 19 (FIG. 1), and the latter remains closed.

In the initial condition of the system, the air stream of sensing device 36 enters line 103 and affords control air at tube 183 of TA14 in unit D. Output from the latter is cut-off so that with no air at control tube 186 of TA15, the output of the latter passes over line 255 to the control tube 144 of TA1 in each unit A and B, thus cutting-off outputs from these elements. With air switch 35 at dial zero position and the auxiliary hand 38 at the same position, air output is absent in line 106 and at control tube 181 of TAX in unit C. Hence, TAX has an output to the tube 176 of TA10, thus cutting-off output from the latter to tube 171 of TA9. Also, since TA5 in each unit A and B then has no output, signal air will be absent at tubes 172 and 173 of TA9. Consequently, TA9 has an output to tube 175 of TA10 which holds the latter in no-output condition when the auxiliary hand 38 moves from air cut-off position at switch 35 (which permits air output on line 106 to tube 181 of TAX, cutting off output from the latter to tube 176 of TA10 as this will be referred to presently). In addition, the output from TA9 provides signal air at tube 178 of TA11, thus cutting-off output from the latter. Finally, the output from TA13 in unit D appears at tube 180 of TA12 in unit C, thus cutting-off output of the latter to actuator 250, so that valve 207 remains closed. The system is now ready for the filling operation.

*Container filling operation*

Consider first the filling of container 11 and the operation of relay unit A in control thereof, system valve 190 is opened and the operator presses the start button 262 to open valve 259. Signal air thus present at tube 182 of TA13 (unit D), cuts-off output to line 255, so that no signal air is present at tubes 146 and 162 of the respective elements TA2 and TA6. The output of TA15 in unit D remains, so that no output appears at TA1 to either tube 147 of TA2 or tube 157 of TA5. Since momentary opening of start valve 259 produces signal air at tube 150 of TA3, the output of the latter is cut-off, and hence no control air at tube 145 of TA2 or at tube 154 of TA4. Thus TA2 has an output to tube 149 of TA3, holding its output cut-off when the push button 262 is released. TA2 output also produces control air at tubes 165 of TA7 and 158 of TA5, thus cutting off outputs from these elements. At this time there is no output from TA11 (unit C) in view of the output from TA9 to TA11 tube 178, so that signal air is absent at tube 153 of TA4. Also, since valve 258 is closed, signal air is absent from tube 152 of TA4. Hence TA4 has an output to actuator 231 causing the latter to open valve 206 to deliver high pressure air through shift valve 210 to delay valve 212.

Coincidentally in this phase of the operation, with output cut-off at TA13 and since TA10 has no output, control air will not appear at the tubes 179-180 of TA12. Thus TA12 has an output to actuator 250 to cause opening of valve 207, the latter passing full air pressure to valve 219, causing the latter to divert line 216 air delivery from the line 136 to the air motor of the auxiliary hand 38, to the line 122 leading to the air clutch (FIG. 2) for effecting clutch connection of the auxiliary hand to the indicator shaft 33 for conjoint movement with the main hand 27. Air output from valve 207 also goes to timer valve 224 which is set to deliver air to delay valve 212 for holding the latter closed for a determined short time sufficient to attain full clutch-in of the auxiliary hand 38. At the end of the short set time, valve 224 cuts-off air to valve 212, permitting the latter to open and pass high pressure air over line 41 to the motor 20 of gate valve 18 (FIG. 1). Gate valve 18 thus opened, material feeds into container 11 at a desired fast rate.

Continuing with relay unit A, TA7 has no output since there is air present at its tube 165 from the output of TA2, and at its tube 164 from the then present output from TA6. Hence air is absent from tube 169 of TA8, and is also absent from its tube 167 because valve 258 is closed, and from its tube 168 due to no output from TA11 due to air at its tube 178 from the output of TA9. Thus, TA8 has an output to actuator 238 which opens low pressure valve 218. However, because at this time high pressure valve 206 is open, the shuttle valve 210 remains in high pressure air feed to line 41.

Now, as material feeds into container 11 at a fast rate, the auxiliary hand 38 moves up scale and in leaving the position of switch 35, air output from the latter appears in line 106 to tube 181 of TAX, thus cutting off its output to tube 176 of TA10. However, TA9 output to tube 175 of TA10 then maintains the latter with no output. When the leading edge of the hand interceptor 110 interrupts the air stream in net weight sensing device 36, air flow in line 103 stops so that signal air is then absent at tube 183 of TA14 in unit D. With absence of signal air at its tube 184 from TA11 in unit C. TA14 has an output to the tube 186 of TA15, thus cutting off the output of the latter to line 255. With no air in line 255 to tube 144 of TA1, the latter has an output to tube 147 of TA2, thus cutting off the output from the latter to tube 149 of TA3 and resulting in output from TA3 to tube 154 of TA4, to stop the output from TA4 to actuator 231. Valve 206 then returns to its normal closed position, relieving high pressure air from shuttle valve 210 which then responds to low pressure air from valve 218 (output at TA8, and not output at TA7 in view of output from TA6), to pass such air to the line 41. Motor 20 in response to the low pressure air, partially closes gate valve 18 to afford only a small or dribble rate of material feed into container 11. The interceptor 110 of auxiliary hand 38 now moves upscale slowly through the air stream in sensing device 36, in response to dribble feed. Further in this phase, output from TA1 goes to tube 157 of TA5, thus continuing cut-off of output from the latter. Also, output continues from TA9, which continues output cut-off at TA10, while no output continues at TA13 and output continues at TA12 (to maintain the clutched condition of the auxiliary hand).

Regarding the dribble feed duration, this is controlled according to the width of the interceptor 110. The interceptor width is predetermined for each given material to be admitted to the containers, according to the average rate of dribble flow of the given material and the average unit volume weight of the given material. For example, where the unit weight and dribble flow rate of a given material are such that the desired final weight filling of a container will be reached in scale indicator movement of say 10 dial graduations, then the interceptor 110 is given a width such that from the point of its leading edge entering the air stream of sensing device 36, its trailing edge will leave the air stream when the indicator has moved through 10 dial graduations.

When the auxiliary hand interceptor 110 has moved upscale sufficiently to remove its trailing edge from the air stream of sensing device 36 (container 11 then being filled to the desired amount), the stream is re-established and signal air appears in line 103 to TA14 cutting-off its output to TA15. With output return at TA15, signal air appears at TA1 cutting-off its output to TA2 and TA5, and the latter (no output from TA7 and TA2) now has an output to TA9 stopping its output to the control tubes of TA10 and TA11. Since at this time output from TAX is absent, TA10 has an output to tube 171 of TA9 as a no-output hold of TA9, and to tube 179 of TA12 to cut-off output from the latter. Absent output from TA12, actuator 250 is no longer effective and valve 207 returns to closed condition, restoring valve 219 to its position passing low pressure air over line 136 to the air motor of the auxiliary hand 38, driving the latter down-scale to the dial zero position.

In order to allow return of hand 38 when its control element passes through air switch 36, without then unwanted material feed operation of the system, output of TA11 produces control inputs to the respective tubes 153 and 168 of TA4 and TA8 in each unit A and B, preventing outputs therefrom so that all valves 206 and 218 are then closed. Thus, gate valve 18 assumes its closed condition (container 11 now filled to the desired net weight of material), and gate valve 19 remains closed. Output from TA11 also goes to control tube 184 of TA14, cutting-off its output to tube 186 of TA15 and thus producing output from the latter to the tube 144 of TA1 in each unit A and B, so that outputs from the latter are then absent.

The output from TA5 of unit A also goes to the control tube 150 of TA3 in unit B, thus preventing output from the latter and thereby conditioning unit B for fast filling operation, when released as will presently appear. It is to be noted here that the output from TA5 (unit A) to TA3 in unit B, serves the same purpose as the manual start valve 259 provided for initiating operation of unit A. This results in unit B assuming the fast feed condition corresponding to that previously effected for unit A, except that at this point, outputs are absent from TA4 and TA8. Also, TA6 in unit B has an output over line 243 to tube 161 of TA6 in unit A, thus cutting-off output from the latter and resulting in the system of unit A assuming its original or initial condition.

When the auxiliary hand 38 returns to dial zero position, the following system changes occur. Signal air in line 106 from switch 35 is cut-off, which results in output from TAX to the control tube 176 of TA10, cutting off output from the latter to the respective control tubes of TA9 and TA12. The resulting output from TA9 holds TA10 with no output, and removes the output of TA11 so that control signal air is removed from TA4 and TA8 in unit B. The latter two elements then have outputs to the respective actuators 231 and 238 (unit B), to cause opening of the associated valves 206 and 218. In addition, signal air is then absent from tube 184 of TA14, but air from line 103 to its tube 183 retains a no-output condition of TA14. Thus with no control input to tube 186 of TA15, the output of the latter prevents output from TA1 of unit B. Since TA12 now has an output to actuator 250, valve 207 is opened to cause low pressure air transfer in valve 219 to line 122 for effecting clutched connection of the auxiliary hand 38 for movement with main hand 27.

With outputs from TA4 and TA8 in unit B producing open conditions of the associated valves 206 and 218, unit B proceeds through the fast feed and dribble feed cycles in respect to container 12, in the manner described for unit A (starting with the output-no output condition of the TA elements of unit B as this appears in the table of FIG. 5, under the heading "Transfer to Unit B Operation—Final"). However, since container 12 is the last container on the scale to be filled (according to the present example), the system must be shut down following filling of such container, preparatory to replacement of the full containers with empty containers for repeat of the filling sequence. This is accomplished by delivery of the output of TA5 in unit B to TA9 and to tube 161 of TA6 in unit B, so that units A and B then assume their initial conditions.

Regarding the air switch 37, this affords an over-shoot shut-down control in the event of mal-function of the system in filling either container beyond the desired net weight. Should such mal-function occur, the auxiliary hand 38 will continue up scale to the zone of switch 37 and there intercept the switch air stream to cut-off signal air in line 100 to the control tube 182 of TA13. Consequently, and as will appear from the description hereinbefore of the initial condition of the system, the resulting output from TA13 to the control tubes of the TA2 and TA6 elements will cause immediate return of the system to its initial state.

An advantageous feature of the present improvements is found in the embodiment in the control system as shown by FIG. 4, of an over-riding control provision permitting suspension or stoppage of system operation at any point in its container filling control sequence, for as long a period as desired, and then resumption of system operation from its sequence point of stoppage. Such control provision is provided by the switch 256 and the signal air line 264 to the control tubes 152 and 167 of the respective TA4 and TA8 elements in each unit A and B. When it is desired or found necessary for any reason to effect a pause in or suspension of container filling operation of the system, the operator actuates switch 258 from its "Run" position (switch closed) as shown in FIG. 4, to its "Stop" position. In the latter position, the switch passes signal air to the indicated tubes of the TA4 and TA8 elements, which thus cuts-off the outputs from these elements to the associated valve actuators 231 and 238, resulting in closure of the valves 206 and 218. The override control in this condition, thus stops gate valve feed of material, but does not change any of the control conditions present in the remainder of units A to D at the point of over-ride suspension of the system. Return of switch 258 to its "Run" position effected at the will of the operator, stops signal air to the TA4 and TA8 elements and thus restores the system for resumption of sequential operation from the point of the pause.

It will be now appreciated from the foregoing that while the presently illustrated example of the system is related to the filling of but two containers at a time, such system is readily adaptable to the filling in sequence, of three or more containers at a time. This may be accomplished, of course, by interposing between relay units A and B one or more like relay units, according to the desired number of containers to be filled in sequence. In such case the first additional unit would have its operation initiated from the output of TA5 in unit A, and it in turn would initiate operation of the next additional unit from the output of its TA5 element, and so on to the last unit B.

Having now described and illustrated an exemplary embodiment of the invention, it is desired to emphasize that the present improvements afford a highly responsive, quick acting control system which is particularly suitable for bulk material filling of containers. The turbulence amplifier elements of the relay units advantageously permit the use of very low pressure operating and control air in the signal control portion of the system including the sensing air switches, resulting in a desirable low rate of air consumption yet without adversely affecting the very rapid response characteristic of these parts in operation. Importantly moreover, since the improved control arrangement hereof is entirely an air operated system, it is explosion-proof.

It is to be understood that the invention embodiment herein shown and described is illustrative only, and that modifications may be made thereto without departing from the scope of the invention as hereinafter claimed.

I claim:

1. In weighing apparatus for container filling to a selected weight of given material, having weight indicator means including a fixed weight indicia dial and a weight responsive main pointer movable over the dial, and having material feed means including a normally closed gate valve having motor means for opening the valve, the combination therewith of
   (a) pneumatic control means in control of said motor means and including
   (b) air switch means settable in registry with a weight indicia on said dial corresponding to the selected container filling weight,
   (c) an auxiliary dial pointer,
   (d) clutch means for connecting the auxiliary pointer to said main pointer for movement therewith,
   (e) said pneumatic control means including means in control of said clutch means,
   (f) and means on the auxiliary dial pointer for controlling said switch means when said pointer attains the dial indicia region in which the switch means is set,
   (g) said pneumatic control means being operable to effect sequentially, operation of the clutch means to connect the auxiliary pointer to said main pointer, operation of said motor means to open said gate valve, and in response to switch means control by said means on the auxiliary pointer, conditioning of said motor means to cause gate valve closure.

2. In weighing apparatus for container filling to a selected weight of given material, having weight indicator means including a fixed weight indicia dial and a weight responsive main pointer movable over the dial, and having material feed means including a normally closed gate valve having motor means for opening the valve, the combination therewith of
   (a) pneumatic control means in control of said motor means and including
   (b) air switch means settable in registry with a weight indicia on said dial corresponding to the selected container filling weight,
   (c) an auxiliary dial pointer rotatable coaxially of the main pointer,
   (d) releasable clutch means for connecting the auxiliary pointer to said main pointer for movement therewith,
   (e) releasable actuator means operable in the released condition of said clutch means to dispose said auxiliary pointer in registry with the zero weight indicia of the dial,
   (f) said pneumatic control means including means in control of said clutch means and said actuator means,
   (g) and means on the auxiliary dial pointer for controlling said switch means when said pointer attains the dial indicia region in which the switch means is set,
   (h) said pneumatic control means operable to effect sequentially, release of said actuator means, operation of the clutch means to connect the auxiliary pointer to said main pointer, operation of said motor means to open said gate valve, thereafter in response to switch means control by said means on the auxiliary pointer, conditioning of said motor means to cause gate valve closure, and release of said clutch means.

3. Weighing apparatus as set forth in claim 2, further characterized by over-riding control means in connection to the said pneumatic control means, operable at will from a normally ineffective condition to a condition causing suspension of operation of the pneumatic control means, and returnable at will to its said normally ineffective condition, to restore operation of the said pneumatic control means.

4. Weighing apparatus as set forth in claim 2 wherein the said releasable clutch means is a pneumatic clutch having normally disengaged clutch elements, one thereof responding to air pressure thereagainst by displacement to clutching engagement with the other element.

5. Weighing apparatus as set forth in claim 2 wherein the said releasable actuator means is a pneumatic motor device.

6. In weighing apparatus for container filling to a selected weight of given material, having weight indicator means including a fixed weight indicia dial and a weight responsive main pointer movable over the dial, and having material feed means including a normally closed gate valve having motor means for opening the valve, the combination therewith of
   (a) pneumatic control means in control of said motor means and including
   (b) first air switch means settable in registery with a weight indicia on said dial corresponding to the selected container filling weight,
   (c) and another air switch means upscale from said first air switch means and normally set in registry with the weight indicia on said dial corresponding to the maximum material weight capacity of the container to be filled,
   (d) an auxiliary dial pointer rotatable coaxially of the main pointer,
   (e) releasable clutch means for connecting the auxiliary pointer to said main pointer for movement therewith,
   (f) releasable actuator means operable in the released condition of said clutch means to disposed said auxiliary pointer in registry with the zero weight indicia of the dial,
   (g) said pneumatic control means including means in control of said clutch means and said actuator means,
   (h) and means on the auxiliary dial pointer for controlling said first switch means when said pointer attains the dial indicia region in which the first switch means is set, (i) said pneumatic control means normally being operable to effect sequentially, release of said actuator means, operation of the clutch means to connect the auxiliary pointer to said main pointer, operation of said motor means to open said gate valve, thereafter in response to switch means control by said means on the auxiliary pointer, conditioning of said motor means to cause gate valve closure, and release of said clutch means, (j) and said another switch means responding to control thereof by said means on the auxiliary pointer in abnormal movement of the auxiliary pointer to the dial indicia region in which the said another switch means is set, to cause cessation of operation of said pneumatic control means.

7. In weighing apparatus for filling containers to a selected weight of given material, having weight indicator means including a fixed weight indicia dial and a weight responsive main pointer movable over the dial, and having material feed means including normally closed gate valves individual to the containers and each having motor means for opening the associated valve, the combination therewith of (a) pneumatic control means in control of said motor means and including (b) a first air switch means settable in registry with a weight indicia on said dial corresponding to the selected container filling weight, and (c) a second air switch means fixed in registry with the zero indicia of said dial, (d) an auxiliary dial pointer rotatable coaxially of the main pointer, (e) releasable clutch means for connecting the auxiliary pointer to the main pointer for movement therewith, (f) releasable actuator means operable in the released condition of said clutch means to dispose said auxiliary pointer in registry with the zero indicia of the dial, (g) said pneumatic control means including means in control of said clutch and actuator means, (h) and means on the auxiliary pointer for controlling said second air switch means when the said pointer is in the dial zero region and for controlling said first air switch means when the said pointer attains the dial indica region in which the first switch means is set, (i) the pneumatic control means being operable to effect in sequence, release of said actuator means, operation of the clutch means to connect the auxiliary pointer to the main pointer, operation of the motor means of one gate valve to open the valve, thereafter in response to control of said first switch means by said means on the auxiliary pointer, conditioning of the motor means of said one gate valve to cause closure of said valve, thence release of said clutch means whereupon said actuator means disposes the auxiliary pointer at dial zero position, the pneumatic control means then responding to control of said second air switch means by said means on the auxiliary pointer, to effect sequentially, release of said actuator means, operation of the clutch means to connect the auxiliary pointer to the main pointer, operation of the motor means of another gate valve to open the valve, thereafter in response to control of said first switch means by said means on the auxiliary pointer, conditioning of the motor means of said another gate valve to cause closure of the said valve, and thence release of said clutch means with return of the auxiliary pointer by said actuator means to dial zero position.

8. Weighing apparatus as set forth in claim 7, further characterized by over-riding control means in connection to the said pneumatic control means, operable at will from a normally ineffective condition to a condition causing suspension of operation of the pneumatic control means, and returnable at will to its said normally ineffective condition, to restore operation of the said pneumatic control means.

9. Weighing apparatus as set forth in claim 7 wherein the said releasable clutch means is a pneumatic clutch having normally disengaged clutch elements, one element thereof responding to air pressure thereagainst by displacement to clutching engagement with the other element, and wherein the said releasable actuator means is a pneumatic motor device.

10. In weighing apparatus of load platform type for filling of at least two platform supported containers each to a selected weight of given material, having weight indicator means including a fixed weight indicia dial and a load weight responsive main pointer movable over the dial, and material feed means including a first gate valve for one container and a second gate valve for the other container, the gate valves being normally closed and each having motor means for opening the associated valve, the combination therewith of (a) pneumatic control means in control of said motor means and including (b) a first air switch means settable in registry with a weight indicia on said dial corresponding to the selected container filling weight, and (c) a second air switch means fixed tn registry with the zero indicia of said dial, (d) an auxiliary dial pointer rotatable coaxially of the main pointer, (e) releasable clutch means for connecting the auxiliary pointer to the main pointer for movement therewith, (f) releasable actuator means operable in the released condition of said clutch means to dispose said auxiliary pointer in registry with the zero indicia of the dial, (g) said pneumatic control means including means in control of said clutch and actuator means, (h) means on the auxiliary pointer for controlling said second air switch means when the said pointer is in the dial zero region and for controlling said first air switch means when the said pointer attains the dial indicia region in which the first switch means is set, (i) and manually operated means for initiating operation of said pneumatic control means, (j) the pneumatic control means operating from an initial condition upon initiation of operation thereof by said manually operated means, to effect in sequence, release of said actuator means, operation of the clutch means to connect the auxiliary pointer to the main pointer, operation of the motor means of said first gate valve to open the valve, thereafter in response to control of said first switch means by said means on the auxiliary pointer, conditioning of the motor means of said first gate valve to cause closure of said valve, thence release of said clutch means whereupon said actuator means disposes the auxiliary pointer at dial zero position, and the pneumatic control means then responding to control of said second air switch means by said means on the auxiliary pointer, to effect sequentially, release of said actuator means, operation of the clutch means to connect the auxiliary pointer to the main pointer, operation of the motor means of said second gate valve to open the valve, thereafter in response to control of said first switch means by said means on the auxiliary pointer, conditioning of the motor means of said another gate valve to cause closure of the said valve, and thence release of said clutch means with return of the auxiliary pointer by said actuator means to dial zero position.

11. Weighing apparatus as set forth in claim 10 further characterized by means included in the said pneumatic control means, effective following sequential operation of the pneumatic control means through closure of the said second gate valve, to stop further operation of the pneumatic control means and cause return thereof to its said initial condition.

12. Weighing apparatus according to claim 11 further characterized by over-riding control means in connection to the said pneumatic control means, operable at will from a normally ineffective condition to a condition causing suspension of operation of the pneumatic control means, and returnable at will to its said normally ineffective condition, to restore operation of said pneumatic control means.

13. Weighing apparatus according to claim 12 wherein the said releasable clutch means is a pneumatic clutch having normally disengaged clutch elements, one element thereof responding to air pressure thereagainst by displacement to clutching engagement with the other element, and wherein the said releasable actuator means is a pneumatic motor device.

14. Weighing apparatus as set forth in claim 10 further characterized by a third air switch means included in the said pneumatic control means and normally set upscale from the said first air switch means in registry with the weight indicia on the said dial corresponding to the container maximum material weight capacity, said third air switch means being responsive to control thereof by the said means on the auxiliary pointer in abnormal movement of the auxiliary pointer to the dial indicia region in which said third air switch means is set, to cause cessation of operation of the said pneumatic control means.

15. In apparatus for container filling to a selected weight of given material, having container supporting weight responsive means including a weight indicator having a weight indicia dial and a main dial pointer, and having material supply means including a normally closed gate valve and motor means for opening the valve for container filling, the improvement therein comprising
(a) pneumatic control means including
(b) air switch means settable in registry with a dial weight indicia corresponding to the selected container filling weight,
(c) an auxiliary dial pointer normally urged to an initial position in registry with the dial zero indicia, and being releasably connectible to the main dial pointer for movement therewith,
(d) said pneumatic control means being in control of said gate valve motor means and said auxiliary dial pointer and being operable to effect connection of the auxiliary dial pointer to the main dial pointer and operation of said motor means to open the gate valve, and
(e) means on the auxiliary dial pointer for operating said switch means when the auxiliary pointer attains the position of the switch means,
(f) the pneumatic control means in response to said operation of the switch means, causing cessation of motor means operation with return of the gate valve to closed position and release of the auxiliary dial pointer from connection to the main pointer with return of the auxiliary dial pointer to its said initial position.

16. Apparatus according to claim 15 characterized further by time delay means operable to effect a predetermined minimum time delay in the said gate valve opening operation of the said motor means by the said pneumatic control means until completion of said operation of the pneumatic control means to effect connection of the auxiliary dial pointer to the main dial pointer.

References Cited

UNITED STATES PATENTS

| | | | |
|---|---|---|---|
| 2,626,121 | 1/1953 | Sachse | 177—73 |
| 3,133,604 | 5/1964 | Gardner | 177—70 |
| 3,238,916 | 3/1966 | Hale | 177—166 |
| 3,266,583 | 8/1966 | Hale | 177—166 |
| 3,343,616 | 9/1967 | Fellows | 177—70 |

ROBERT S. WARD, JR., *Primary Examiner.*

L. HAMBLEN, *Assistant Examiner.*